Sept. 7, 1965              V. PACE              3,204,413
FILTER AND CONDITIONER AND BRAKE SYSTEM INCLUDING THE SAME
Filed July 6, 1964              2 Sheets-Sheet 1
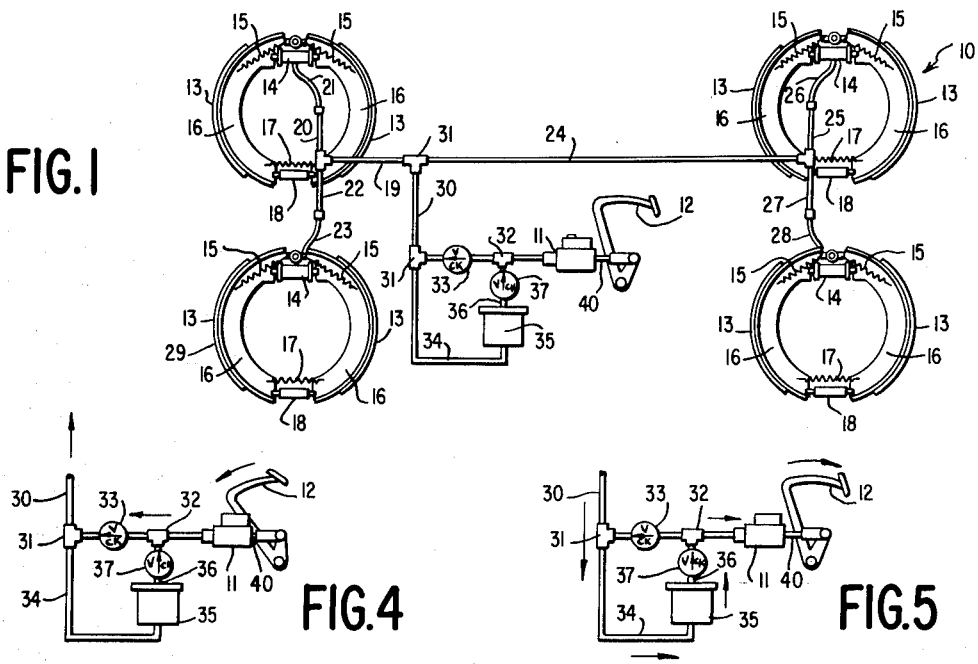
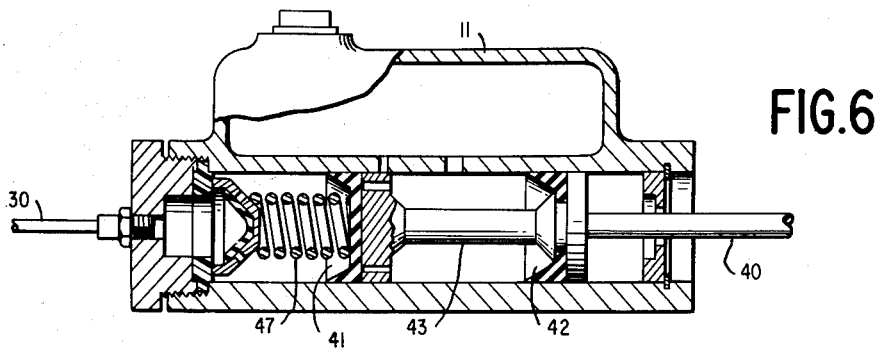
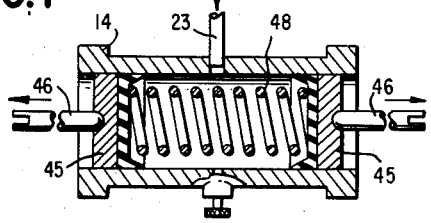
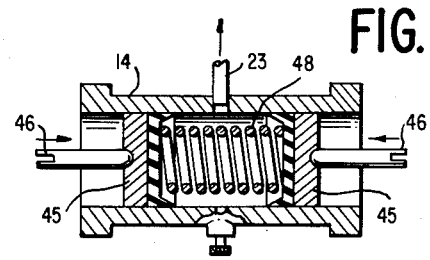
INVENTOR.
VIRGIL PACE
BY
*L.S. Vanlandigham, Jr.*
ATTORNEY

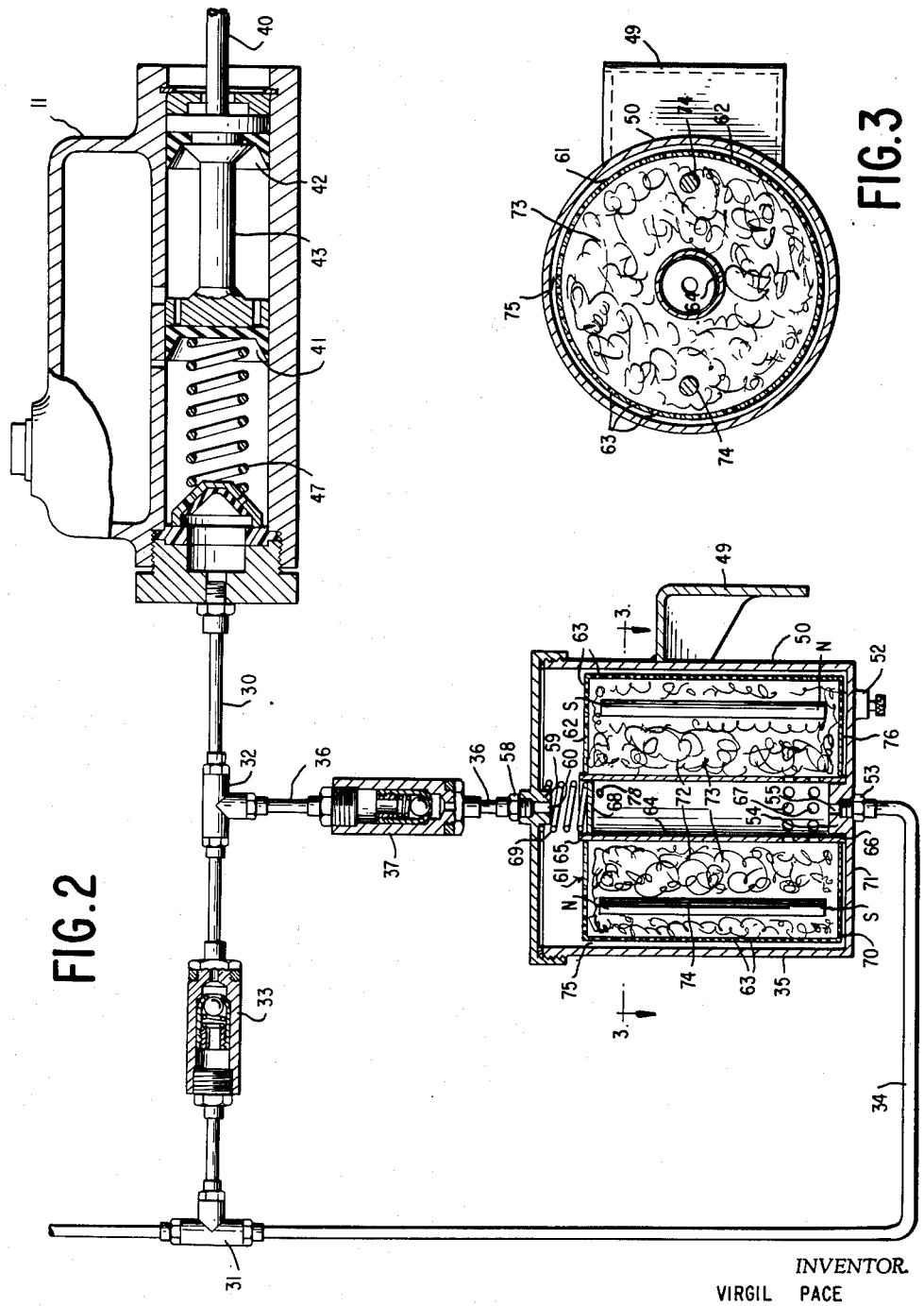

United States Patent Office 3,204,413
Patented Sept. 7, 1965

3,204,413
FILTER AND CONDITIONER AND BRAKE SYSTEM INCLUDING THE SAME
Virgil Pace, Hattiesburg, Miss., assignor of three percent to W. U. (Bill) Sigler, Hattiesburg, Miss.
Filed July 6, 1964, Ser. No. 380,594
14 Claims. (Cl. 60—54.5)

This application is a continuation in part of my copending application Serial No. 280,923, filed May 16, 1963 for Filter and Conditioner and Brake System Including the Same, now abandoned.

This invention relates to a novel filter element, and to an improved filter and conditioner. The invention further relates to a novel hydraulic system including a filter.

The invention will be described and illustrated hereinafter with specific reference to a hydraulic brake system for a motor vehicle. However, it will be appreciated by those skilled in the art that the invention is useful in other environments, and especially for the purification and conditioning of liquid media including fluids for hydraulic systems.

The hydraulic braking systems presently used on motor vehicles are not provided with means for the removal of foreign materials which gradually collect in the hydraulic fluid. Such foreign materials include dust, rust and metallic particles, and moisture and air which enter the braking system and then condense in the hydraulic fluid. The foreign materials result in and hasten the rapid wear and corrosion of the mechanical components of the braking system and they eventually fail in use. Damage to the braking system also may result in the winter months due to freezing of the water in the hydraulic fluid. It is therefore apparent that the lives of the passengers in the motor vehicle are endangered as the motor vehicle ages, as well as requiring frequent expensive repairs.

Still another important disadvantage of the hydraulic braking systems presently in use is that extended application of the brakes in hilly or mountainous areas results in a rapid buildup of heat due to braking friction which is transmitted to the hydraulic fluid. With continued application of the brakes, the hydraulic fluid is heated at hot points to a sufficiently high temperature to produce vapor, and the vapor may cause a brake failure. The present invention also is highly effective for maintaining the hydraulic fluid at a satisfactory operating temperature with extended application of the brakes.

It is an object of the present invention to provide a novel filter element which is especially useful for removing suspended solid particles from liquid media.

It is a further object to provide filtering apparatus which may include the filter element of the invention.

It is still a further object to provide a novel filter and conditioner for hydraulic fluids of the type used in braking systems for motor vehicles.

It is still a further object to provide a novel hydraulic brake system for motor vehicles which is provided with an effective filter for the hydraulic fluid.

Still other objects and advantages will be apparent to those skilled in the art upon reference to the following detailed description and the drawings, wherein:

FIGURE 1 diagrammatically illustrates the braking system for motor vehicles of the invention;

FIGURE 2 is a view, partially in cross-section and with portions broken away, illustrating the construction and arrangement of the filter and conditioner and its relation to other components of the braking system;

FIGURE 3 is a cross-sectional view taken along the line 3—3 of the filter and conditioner of FIGURE 2;

FIGURE 4 diagrammatically illustrates the flow of hydraulic fluid in the braking system upon application of the brakes;

FIGURE 5 diagrammatically illustrates the flow of hydraulic braking fluid in the braking system upon release of the brakes;

FIGURE 6 is a view partially in cross-section with portions thereof broken away, of the master cylinder illustrating the position of component parts upon application of the brakes;

FIGURE 7 is a longitudinal cross-sectional view of a wheel cylinder illustrating the position of component parts with the brakes being applied; and FIGURE 8 is a longitudinal cross-sectional view of a wheel cylinder illustrating the position of component parts with the brakes being in a released position.

Referring now to the drawings, a brake system 10 for a four wheel motor vehicle is illustrated in FIGURE 1. The master cylinder 11, brake pedal 12, brake drums 13, wheel cylinders 14, springs 15, brake shoes 16, springs 17, brake shoe adjusting means 18, and conduits 19, 20, 21, 22, 23, 24, 25, 26, 27 and 28 may be of the prior art design and construction. Main brake line or conduit 30 is provided with T-connections 31 and 32 and one-way ball checkvalve 33. Return conduit 34 extends from T-connection 31 to filter and conditioner 35, and return conduit 36 extends from the filter 35 to conduit 30 and is provided with one-way ball checkvalve 37. Conduit 36 is connected with conduit 30 by means of T-connection 32.

The master cylinder 11 illustrated in FIGURES 2 and 6 and wheel cylinder 14 for wheel 29 illustrated in FIGURES 7 and 8 also may be of prior art design and construction. The views illustrated in FIGURES 2 and 8 show the master cylinder 11 and wheel cylinder 14 with the component parts in the positions occupied when the brakes are not applied, while FIGURES 6 and 7 illustrate the master cylinder 11 and wheel cylinder 14 with the component parts in the positions occupied when the brakes are applied.

The component parts of the brake system are filled with the hydraulic brake fluid and when the brake pedal 12 is depressed to the position shown in FIGURE 4, the piston action rod 40 mechanically linked thereto is moved to the left toward conduit 30, and primary cylinder cup 41 and secondary cylinder cup 42 carried by piston 43 are likewise moved to the left. This forces hydraulic fluid under pressure through the main brake line or conduit 30 and opens checkvalve 33 and closes checkvalve 37, and the hydraulic fluid flows under pressure via conduits 19–28 and 30 to the four wheel cylinders 14.

As best seen in FIGURES 1, 2, 7 and 8, supplying hydraulic fluid under pressure from master cylinder 11 to wheel cylinder 14 through conduits 30, 19, 22 and 23 causes the wheel cylinder pistons 45 to move outward, thereby causing brake shoe expansion pins 46 likewise to move outward and force brake shoes 16 into frictional engagement with brake drums 13. In this position, the springs 15 are in an extended position and urge the pistons 45 inward toward the position shown in FIGURE 8, thereby tending to force the hydraulic fluid out of the wheel cylinder 14 and back to master cylinder 11. The spring 47 for master cylinder 11 is in a compressed position and tends to return the piston 43 to the position shown in FIGURE 2. Upon release of the brake pedal 12, it moves to the position shown in FIGURE 5 thereby allowing the master cylinder piston 43 and the wheel cylinder pistons 45 to return to the positions shown in FIGURES 2 and 8, respectively. At that time, hydraulic fluid is returned to the master cylinder 11 via conduits 23, 22, 19, 30 and 34, filter 35, conduit 36 including open checkvalve 37 and conduit 30 including closed checkvalve 33.

It may be best seen from FIGURES 4 and 5 that the checkvalve 33 is open and checkvalve 37 is closed upon depressing brake pedal 12 thereby allowing the brakes to be applied and hydraulic fluid to flow to the wheel cylinders. The flow of hydraulic fluid is reversed upon release of the brake pedal 12, and checkvalve 33 is closed and checkvalve 37 is open thereby allowing the brake fluid to return via conduit 34, filter 35 and conduits 36 and 30 to the master cylinder 11. It is therefore apparent that the energy required for returning the hydraulic fluid to the filter 35 and for filtering the hydraulic fluid is supplied by the brake system 10 itself in normal operation and an additional energy source is not necessary. Also, the full flow of hydraulic fluid returning to the master cylinder 11 passes through filter 35 and is filtered thereby.

As best seen in FIGURES 2 and 3, the filter and conditioner 35 include a filter housing 50 which may be cylindrical in shape and provided with a bracket 49 for attaching to a supporting member, a threaded top 51, a bleeder valve 52 and a connecting member 53 for attaching the conduit 34 to the bottom thereof. The bottom of the housing 50 also has an internally arranged cylindrical portion 54 and an opening 55 extends through the housing 50 and portion 54 to thereby allow hydraulic fluid to pass via conduit 34 through member 53 and cylindrical portion 54 into the filter housing 50. Similarly, the top 51 is provided with a connecting member 58 for attaching conduit 36 thereto and a cylindrical portion 59 extends downward from the under surface. An opening 60 extends through the top 51 and cylindrical portion 59 to thereby allow filtered hydraulic fluid to flow out of filter housing 50 through cylindrical portion 59 and connecting member 58 and into conduit 36.

A filter element 61 which may be cylindrical in shape is mounted within filter housing 50. The filter element 61 includes a container 62 having perforations 63 for passage of filtered brake fluid therefrom. A tubular member 64 of a length greater than the height of container 62 extends through container 62 and outward past the ends thereof to thereby provide a tubular extension 65 and on the upper end and tubular extension 66 on the lower end. The wall of tubular member 64 is provided with a plurality of openings 67 near the inlet end which are in communication with the interior of container 62 and serve to feed hydraulic fluid to be filtered from conduit 34 through opening 55 into the interior of container 62. A small opening 78 which may be about 1/32" in diameter is provided near the outer end of tubular member 64 which serves to allow any trapped air to pass out into the interior of container 62 and ultimately back to master cylinder 11 for bleeding to the atmosphere. The tubular member 64 is closed on its outer end by means of closure 68, which together with portion 65 forms a seat for the lower end of spring 69. The spring 69 is retained on its upper end by insertion around cylindrical portion 59 and urges the container 62 downward into a proper filtering position.

The diameters of tubular extension 66 and cylindrical portion 54 are such so as to make an effective seal therebetween when these elements are in the position shown in the drawings, thereby assuring that the hydraulic fluid to be filtered passes from conduit 34 via opening 55, tubular member 64 and openings 67 into container 62. The tubular extension 66 is of a length so as to assure that the bottom 70 of container 62 is spaced from the bottom 71 of filter housing 50, thereby allowing bleeder valve 52 to be opened periodically and accumulated water to be withdrawn.

The interior 72 of container 62 is filled with a fibrous filtering medium 73 such as Densite, or any other suitable filtering medium for removing suspended particles. Elongated magnets 74 are embedded in filtering medium 73 and preferably with the poles of adjacent magnets alternating between north and south, as illustrated in the drawings. This provides a magnetic field of maximum strength within the filtering medium 73, which in turn assures that a maximum amount of the magnetizable solid particles suspended in the hydraulic fluid to be filtered will be magnetically attracted and retained thereby. The magnets 74 may be of any suitable shape and any satisfactory number may be employed.

It may be noted that the flow of hydraulic fluid to be filtered through the filtering element 61 is such that the filtering medium 73 and the magnets 74 are positioned in the path of flow as it passes between openings 67 and perforations 63, thereby assuring that solid suspended particles are removed. Also, the diameter of container 62 is less than that of the filter housing 50, thereby forming an annular space 75. The space 75 and the space 76 between the bottom 70 and bottom 71 allows water to collect in the bottom of filter housing 50 and it may be withdrawn upon opening bleeder valve 52.

The volume of filter housing 50 is such that a supply of filtered, cooled and conditioned hydraulic fluid is available at all times for passing to master cylinder 11 and then to the wheel cylinders 14. Better results are obtained when the filter housing 50 has a volume several times that of master cylinder 11. The volume may be about one pint or greater for automobiles and preferably at least one quart, and the volume may be correspondingly greater for larger vehicles such as two-ton or heavier trucks. Normally the brake pedal 12 is pumped frequently in hilly or mountainous areas and circulation of hydraulic fluid in the brake system is assured.

The filter 35 acts as an air cooler for hot hydraulic fluid returning from the wheel cylinders 14 and the relatively large volume assures that the hydraulic fluid will be mixed with large amounts of cooler hydraulic fluid, thereby reducing the temperature to a level which allows the brake system to be applied frequently for extended periods of time without danger of high vapor pressure or the brake system being inoperative due to overheated hydraulic fluid.

The filter 35 removes solid suspended matter from the brake fluid, such as dust particles, rust particles and fine metal particles, and also allows condensed moisture which would otherwise cause corrosion to be removed via bleeder valve 52. Thus, the brake fluid passing from filter 35 via conduit 36 including open checkvalve 37 and conduit 30 including closed checkvalve 33 to master cylinder 11 is both filtered and conditioned for entirely satisfactory operation of the braking system without danger of brake failure due to rapid wear of the braking system components, corrosion caused by moisture or vaporizing of the hydraulic fluid.

It is apparent from the foregoing that other types of filtering devices may be substituted for the filter which is specifically illustrated in the drawings. For best results the filter should be connected with the main brake line as shown so as to take advantage of the full flow of hydraulic fluid. However, it is possible to withdraw a portion of the returning brake fluid and pass it through a filtering device if this should be desirable.

The foregoing detailed description and the drawings are for purposes of illustration only, and are not intended as being limiting to the spirit or scope of the appended claims.

What is claimed is:

1. A filter element comprising a container, filtering means in the container for removing suspended solid particles from a liquid containing the same, magnet means in the container for magnetically attracting magnetizable particles in a liquid medium containing the same, a conduit extending through the container and sealed therein, the conduit being open at one end and closed at the other end, the wall of the conduit having at least one opening in communication with the interior of the container thereby allowing liquid to be filtered to be passed through the conduit and into the container, at least one opening in in the conduit being remote from the opening in the container whereby the liquid is withdrawn from the container the container for withdrawing filtered liquid, the opening after it passes between the said openings, the filtering means and the magnet means being disposed in the path of flow of liquid passing between the said openings whereby at least a portion of the liquid passes through the filtering means and in effective contact with the magnet means to remove suspended solid particles therefrom.

2. The filter element of claim 1 wherein means is provided for withdrawing trapped air from the closed end of the conduit.

3. A filter element comprising a cylindrical container closed at its top and bottom, filtering means in the container including a fibrous filtering material for removing suspended solid particles from a liquid containing the same, a plurality of elongated magnet means embedded in the fibrous filtering material for magnetically attracting magnetizable particles in a liquid medium containing the same, the north and south poles of the magnets being alternately arranged, an axially aligned tube extending through the cylindrical container and sealed therein, the tube extending past the ends of the cylindrical container and being open at one end and closed at the other end, the wall of the tube having a plurality of openings in communication with the interior of the container thereby allowing liquid to be filtered to be passed through the tube and into the container, the tube having a small opening therein near the closed end for withdrawing trapped air, a plurality of openings in the container for withdrawing filtered liquid, the openings in the tube being remote from the openings in the container whereby the liquid is withdrawn from the container after it passes between the said openings, the filtering means and the magnet means being disposed in the path of flow of liquid passing between the said openings whereby at least a portion of the liquid passes through the filtering means and in effective contact with the magnet means to remove suspended solid particles therefrom.

4. A filter for liquids comprising a housing, a filter element, the filter element including a container, filtering means in the container for removing suspended solid particls from a liquid containing the same, magnet means in the container for magnetically attracting magnetizable particles in a liquid medium containing the same, a conduit extending through the container and sealed therein, the conduit being open at one end and closed at the other end, the wall of the conduit having at least one opening in communication with the interior of the container thereby allowing liquid to be filtered to be passed through the conduit and into the container, at least one opening in the container for withdrawing filtered liquid, the opening in the conduit being remote from the opening in the container whereby the liquid is withdrawn from the container after it passes between the said openings, the filtering means and the magnet means being disposed in the path of flow of liquid passing between the said openings whereby at least a portion of the liquid passes through the filtering means and in effective contact with the magnet means to remove suspended solid particles therefrom, means for mounting the filter element in the housing, means including the said open end of the conduit and the opening in the wall thereof for passing liquid to be filtered into the container from a point outside of the housing and means including the said opening in the container for withdrawing filtered liquid from the container and passing it to a point outside of the housing.

5. The filter of claim 4 wherein means is provided for withdrawing trapped air from the closed end of the conduit.

6. A filter for liquid comprising a cylindrical housing closed at its top and bottom, a filter element, the filter element including a cylindrical container closed at its top and bottom, the container having a smaller diameter and shorter height than the housing, filtering means in the container including a fibrous filtering material for removing suspended solid particles from a liquid containing the same, a plurality of elongated magnet means embedded in the fibrous filtering material for magnetically attracting magnetizable particles in a liquid medium containing the same, the north and south poles of the magnets being alternately arranged, an axially aligned tube extending through the cylindrical container and sealed therein, the tube extending past the ends of the cylindrical container and being open at one end and closed at the other end, the wall of the tube having a plurality of openings in communication with the interior of the container thereby allowing liquid to be filtered to be passed through the tube and into the container, the tube having a small opening therein near the closed end for withdrawing trapped air, a plurality of openings in the container for withdrawing filtered liquid, the openings in the tube being remote from the openings in the container whereby the liquid is withdrawn from the container after it passes between the said openings, the filtering means and the magnet means being disposed in the path of flow of liquid passing between the said openings whereby at least a portion of the liquid passes through the filtering means and in effective contact with the magnet means to remove suspended solid particles therefrom, means for mounting the filter element in the housing, the mounting means including an axially aligned cylindrical first portion extending inward from the internal surface of one end of the housing, the cylindrical first portion being inserted into the open end of the tube and the open end of the tube resting on the end of the housing, the diameter of the container being sufficiently small and the height of the container being sufficiently short and the portion of the open end of the tube extending past the container being of a length whereby the container is spaced from the wall and ends of the housing, the mounting means also including an axially aligned second portion extending inward from the internal surface of the end of the housing opposite the said cylindrical first portion, a spring, the spring being mounted at one end on the said axially aligned second portion and at the other end on the said closed end of the tube, the spring being under compression and urging the container in a direction away from the said axially aligned second portion, means including the said open end of the tube and the openings in the wall thereof for passing liquid to be filtered into the container from a point outside of the housing and means including the said openings in the container for withdrawing filtered liquid from the container and passing it to a point outside of the housing.

7. The filter of claim 6 wherein means is provided for withdrawing from the housing a liquid heavier than the liquid to be filtered.

8. In a hydraulic brake system for a motor vehicle including a reservoir for hydraulic fluid, means for applying pressure to hydraulic fluid, hydraulically actuated braking means for the motor vehicle, means for passing hydraulic fluid from the reservoir to the braking means, the pressure applying means applying pressure to the hydraulic fluid whereby hydraulic fluid under pressure is supplied to the braking means for actuating the same, and means for returning hydraulic fluid from the braking means to the reservoir when the braking means has been actuated and released, the improvement comprising a filter for filtering liquids, the filter being mounted in the path of flow of hydraulic fluid in the said means for returning the hydraulic fluid to the reservoir whereby hydraulic fluid is passed through the filtering means and filtered upon actuating and releasing the braking means and returning the hydraulic fluid to the reservoir, the filter comprising a housing, a filter element, the filter element including a container, filtering means in the container for removing suspended solid particles from the hydraulic fluid, magnet means in the container for magnetically attracting magnetizable particles in the hydraulic fluid, a conduit extending through the container and sealed therein, the conduit being open at one end and closed at the other end, the wall of the conduit having at least one opening in communication with the interior of the container thereby allowing hydraulic fluid to be filtered to be passed through the conduit and into the container, at least one opening in the container for withdrawing filtered hydraulic fluid, the opening in the conduit being remote from the opening in the container whereby the hydraulic fluid is withdrawn from the container after it passes between the said openings, the filtering means and the magnet means being disposed in the path of flow of hydraulic fluid passing between the said openings whereby at least a portion of the hydraulic fluid passes through the filtering means and in effective contact with the magnet means to remove suspended solid particles therefrom, means for mounting the filter element in the housing, means including the said open end of the conduit and the opening in the wall thereof for passing hydraulic fluid to be filtered into the container from a point outside of the housing and means including the said opening in the container for withdrawing filtered hydraulic fluid from the container and passing it to a point outside of the housing.

9. In a hydraulic brake system for a motor vehicle including a reservoir for hydraulic fluid, means for applying pressure to hydraulic fluid, hydraulically actuated braking means for the motor vehicle, means for passing hydraulic fluid from the reservoir to the braking means, the pressure applying means applying pressure to the hydraulic fluid whereby hydraulic fluid under pressure is supplied to the braking means for actuating the same, and means for returning hydraulic fluid from the braking means to the reservoir when the braking means has been actuated and released, the improvement comprising a filter for filtering liquids, the filter being mounted in the path of flow of hydraulic fluid in the said means for returning the hydraulic fluid to the reservoir whereby hydraulic fluid is passed through the filtering means and filtered upon actuating and releasing the braking means and returning the hydraulic fluid to the reservoir, the filter for liquids comprising a cylindrical housing closed at its top and bottom, a filter element, the filter element including a cylindrical container closed at its top and bottom, the container having a smaller diameter and shorter height than the housing, filtering means in the container including a fibrous filtering material for removing suspended solid particles from the hydraulic fluid, a plurality of elongated magnet means embedded in the fibrous filtering material for magnetically attracting magnetizable particles in the hydraulic fluid, the north and south poles of the magnets being alternately arranged, an axially aligned tube extending through the cylindrical container and sealed therein, the tube extending past the ends of the cylindrical container and being open at one end and closed at the other end, the wall of the tube having a plurality of openings in communication with the interior of the container thereby allowing hydraulic fluid to be filtered to be passed through the tube and into the container, the tube having a small opening therein near the closed end for withdrawing trapped air, a plurality of openings in the container for withdrawing filtered hydraulic fluid, the openings in the tube being remote from the openings in the container whereby the hydraulic fluid is withdrawn from the container after it passes between the said openings, the filtering means and the magnet means being disposed in the path of flow of hydraulic fluid passing between the said openings whereby at least a portion of the hydraulic fluid passes through the filtering means and in effective contact with the magnet means to remove suspended solid particles therefrom, means for mounting the filter element in the housing, the mounting means including an axially aligned cylindrical first portion extending inward from the internal surface of one end of the housing, the cylindrical first portion being inserted into the open end of the tube and the open end of the tube resting on the end of the housing, the diameter of the container being sufficiently small and the height of the container being sufficiently short and the portion of the open end of the tube extending past the container being of a length whereby the container is spaced from the wall and ends of the housing, the mounting means also including an axially aligned second portion extending inward from the internal surface of the end of the housing opposite the said cylindrical first portion, a spring, the spring being mounted at one end on the said axially aligned second portion and at the other end on the said closed end of the tube, the spring being under compression and urging the container in a direction away from the said axially aligned second portion, means including the said open end of the tube and the openings in the wall thereof for passing hydraulic fluid to be filtered into the container from a point outside of the housing and means including the said openings in the container for withdrawing filtered hydraulic fluid from the container and passing it to a point outside of the housing.

10. The filter of claim 9 wherein means is provided for withdrawing water from the housing.

11. A hydraulic system comprising
   a hydraulically operated device,
   the device including means actuated in response to passinng hydraulic fluid therein under a relatively high operating pressure
   and means for thereafter passing hydraulic fluid from the device under a relatively low exhausting pressure,
   means for applying pressure to hydraulic fluid,
   liquid conveying means for passing hydraulic fluid between the pressure applying means and the hydraulically operated device,
   the liquid conveying means including first conduit means for passing hydraulic fluid along a first path in a direction toward the hydraulically operated device from the pressure applying means,
   the liquid conveying means also including second conduit means for passing hydraulic fluid along a second path in a direction toward the pressure applying means from the hydraulically operated device,
   at least a portion of the first conduit means forming the said first path being in spaced relationship with respect to at least a portion of the second conduit means forming the said second path,
   the pressure applying means including means for intermittently forcing hydraulic fluid under a relatively high operating pressure through the liquid conveying means including the first conduit means and along the said first path to the hydraulically operated device to thereby actuate the same,
   first liquid flow control means in the said spaced portion of the first conduit means allowing flow of hydraulic fluid therein only along the said first path in a direction toward the hydraulically operated device from the pressure applying means,
   second liquid flow control means in the said spaced second portion of the second conduit means allowing flow of hydraulic fluid therein only along the said second path in a direction toward the pressure applying means from the hydraulically operated device,
   the said means for passing hydraulic fluid from the device including means for intermittently forcing hydraulic fluid under a relatively low pressure through the liquid conveying means including the second conduit means and along the said second path to the pressure applying means,
   the said means for passing hydraulic fluid from the device being operative after the hydraulic device has been actuated and in between the intervals that hydraulic fluid is forced through the said first conduit means,
   means for filtering small solid particles from hydraulic fluid,
   the filtering means being in at least one of the said spaced portions of the first and second conduit means and in at least one of the said first and second paths of flow of hydraulic fluid therein whereby hydraulic fluid is filtered upon operating the device and returning hydraulic fluid to the pressure applying means.

12. The hydraulic system of claim 11 wherein the filtering means is provided with means for withdrawing trapped air.

13. In a hydraulic brake system for a vehicle including means for applying pressure to hydraulic fluid, hydraulically actuated braking means for the wheels of the vehicle, liquid conveying means for passing hydraulic fluid between the pressure applying means and the braking means, the pressure applying means being effective to apply pressure to hydraulic fluid and force hydraulic fluid under pressure through the liquid conveying means to the braking means for actuating the same, and means for returning hydraulic fluid from the braking means to the pressure applying means through the liquid conveying means when the braking means has been applied and released, the improvement comprising liquid conveying means including first conduit means for passing hydraulic fluid along a first path in a direction toward the braking means from the pressure applying means, the liquid conveying means also including second conduit means for passing hydraulic fluid along a second path in a direction toward the pressure applying means from the braking means, at least a portion of the first conduit means forming the said first path being in spaced relationship with respect to at least a portion of the second conduit means forming the said second path, the pressure applying means including means for forcing hydraulic fluid under a relatively high pressure through the liquid conveying means including the first conduit means and along the said first path to the braking means to thereby actuate the same, first liquid flow control means in the said spaced portion of the first conduit means allowing flow of hydraulic fluid therein only along the said first path in a direction toward the braking means from the pressure applying means, second liquid flow control means in the said spaced second portion of the second conduit means allowing flow of hydraulic fluid therein only along the said second path in a direction toward the pressure applying means from the braking means, the said means for returning hydraulic fluid from the braking means including means for forcing hydraulic fluid under a relatively low pressure through the liquid conveying means including the second conduit means and along the said second path to the pressure applying means, means for filtering small solid particles from hydraulic fluid, the filtering means being in the said spaced portion of the second conduit means and in the second path of flow of hydraulic fluid therein whereby hydraulic fluid is filtered upon applying and releasing the braking means and returning hydraulic fluid to the pressure applying means.

14. The hydraulic brake system of claim 13 wherein the filtering means is provided with means for withdrawing trapped air.

No references cited.

SAMUEL LEVINE, *Primary Examiner.*

ROBERT R. BUNEVICH, *Examiner.*